(12) United States Patent
Hsu

(10) Patent No.: US 8,825,667 B2
(45) Date of Patent: Sep. 2, 2014

(54) METHOD AND APPARATUS FOR MANAGING DATA OBJECTS OF A DATA STORAGE SYSTEM

(71) Applicant: Windsor W. Hsu, San Jose, CA (US)

(72) Inventor: Windsor W. Hsu, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/649,902

(22) Filed: Oct. 11, 2012

(65) Prior Publication Data

US 2013/0036104 A1  Feb. 7, 2013

Related U.S. Application Data

(63) Continuation of application No. 12/198,021, filed on Aug. 25, 2008, now Pat. No. 8,316,064.

(51) Int. Cl.
*G06F 17/30* (2006.01)

(52) U.S. Cl.
USPC .......................................... 707/747

(58) Field of Classification Search
CPC ............. G06F 17/30097; G06F 17/30109
USPC ................... 707/698, 813, 816, 747
See application file for complete search history.

(56) References Cited

U.S. PATENT DOCUMENTS

| 4,912,629 | A | 3/1990 | Shuler, Jr. |
| 5,990,810 | A | 11/1999 | Williams |
| 6,105,040 | A | 8/2000 | Agesen |
| 6,253,215 | B1 | 6/2001 | Agesen et al. |
| 7,734,603 | B1 | 6/2010 | McManis |
| 7,783,683 | B2 | 8/2010 | Sekiguchi |
| 2005/0010792 | A1 * | 1/2005 | Carpentier et al. ........... 713/193 |
| 2005/0166187 | A1 | 7/2005 | Das et al. |
| 2006/0074988 | A1 | 4/2006 | Imanishi et al. |
| 2006/0271538 | A1 | 11/2006 | Mizrachi |
| 2007/0043757 | A1 | 2/2007 | Benton et al. |
| 2007/0156967 | A1 | 7/2007 | Bond et al. |
| 2007/0203960 | A1 | 8/2007 | Guo |
| 2008/0195680 | A1 | 8/2008 | Daynes et al. |

FOREIGN PATENT DOCUMENTS

WO   WO-2007089502   8/2007

OTHER PUBLICATIONS

Extended European Search Report, EP Application No. 09812030.6, dated Dec. 21, 2012, 8 pages.
First Office Action, Chinese Application No. 200980133628.6, dated Aug. 5, 2013, 18 pages.

(Continued)

*Primary Examiner* — Jorge A Casanova
(74) *Attorney, Agent, or Firm* — Blakely Sokoloff Taylor & Zafman LLP

(57) ABSTRACT

Techniques for managing data objects of a data storage system are described herein. According to one embodiment, a hash function is generated for a plurality of data objects by analyzing each of the data objects stored in the data storage system. For each of the data objects, a hash operation is performed on the data object using the hash function, generating a hash value. The hash value is associated with a predetermined attribute of the data object, such that the predetermined attribute of the data object is uniquely identified using the hash function subsequently in response to a request for accessing the predetermined attribute of the data object. The data object is then stored at a persistent storage location of the data storage system, wherein the persistent storage location is identifiable based on a hash value obtained from the hash function.

21 Claims, 10 Drawing Sheets

(56) References Cited

OTHER PUBLICATIONS

Friedman, Daniel P., et al., "Garbage Collecting a Heap which includes a Scatter Table", Information Processing Letters, vol. 5, No. 6, Dec. 1976.
International Search Report and Written Opinion, Application No. PCT/US2009/054965, dated Mar. 2, 2010.
International Preliminary Report on Patentability, Application No. PCT/US2009/054965, dated Mar. 1, 2011, 6 pages.
Botelho, Fabian C., et al., "Simple and Space Efficient Minimal Perfect Hash Functions", Oct. 2007, 13 pages, http://homepages.dcc.ufmg.br/~nivio/papers.wads07.pdf.
Zhu, Benjamin, et al., "Avoiding the Disk Bottleneck in the Data Domain Deduplication File System", *Fast '08: 6th USENIX Conference on File and Storage Technologies*, Feb. 2008, 14 pages.

* cited by examiner

METHOD AND APPARATUS FOR MANAGING DATA OBJECTS OF A DATA STORAGE SYSTEM

RELATED APPLICATIONS

This application is a continuation of co-pending U.S. patent application Ser. No. 12/198,021, filed Aug. 25, 2008, which is incorporated by reference herein in its entirety.

FIELD OF THE INVENTION

The present invention relates generally to managing data objects of a data storage system. More particularly, this invention relates to reclaiming resources from unused data objects of a data storage system.

BACKGROUND

Organizations are accumulating large amounts of electronic data. To facilitate the storage of such data, data storage systems need to manage increasingly large numbers of data objects (e.g. files, documents, objects, records, etc) and associate attributes with these objects. Examples of attributes that may be associated with an object include properties of the object that are visible to a user of the system (e.g. access control information, last access time, etc) and properties of the object that are used by the system to manage the object (e.g. location of the object in the system, checksum of the object, etc).

For example, when an object is no longer in use, it is desirable to reclaim resources held by the object and subsequently reuse those resources. To facilitate reclamation of resources, it is often necessary to associate a count of the number of references to an object or an indicator of whether the object is still in use (alive). In many cases, there is a level of indirection (or virtualization) such that an object is used by reference through another object. For clarity, we will refer to the former as a physical data object and the latter as a logical object. In such cases, the physical data object is alive only if the system currently contains a logical object that refers to it. For example, in a file system, a chunk of data is alive only if it is associated with a file that currently exists in the file system.

Some form of index structure is needed to associate attributes with objects. As the number of objects in a system increases, the index structure becomes very big, and it becomes difficult and expensive to use the index structure to look up object attributes quickly. In deduplicating storage systems such as those provided by Data Domain Inc. of Santa Clara, Calif., there could be millions of files and billions of chunks (also referred to as segments) of data shared among multiple files and within each file so that associating attributes with each file and/or segment requires a very large index.

To reduce the size of the index structure, one approach is to use probabilistic index structures that can maintain the correct association between objects and attributes most of the time. For example, a bloom filter may be used to indicate whether a segment is alive. The bloom filter, however, is still relatively large when there are many physical objects and it introduces false positives so that a dead physical object may be deemed to be alive.

SUMMARY OF THE DESCRIPTION

Techniques for managing data objects of a data storage system are described herein. According to one aspect of the invention, a perfect hash function is generated for data objects stored in a data storage system. For each of the data objects, a hash operation is performed using the perfect hash function to indicate whether the respective data object is alive. Resources associated with the respective data object is reclaimed if it is determined that the respective data object is not alive based on a result of the hash operation using the perfect hash function, where the reclaimed resources are released back to the data storage system as free resources.

According to another aspect of the invention, a perfect hash function is generated for data objects stored in a data storage system. For each of the data objects, a hash operation is performed using the perfect hash function, generating a hash value. The hash value is associated with a predetermined attribute of the data object, such that the predetermined attribute of the data object is uniquely identified using the perfect hash function subsequently in response to a request for accessing the predetermined attribute of the data object.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for managing data objects of a data storage system are described herein. According to certain embodiments, an efficient mechanism for reclaiming resources is utilized by analyzing the physical objects currently in a data storage system to generate a perfect hash function for these objects. The perfect hash function is used to compactly mark live objects. Thereafter, the resources of the objects that have not been marked can be reclaimed.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
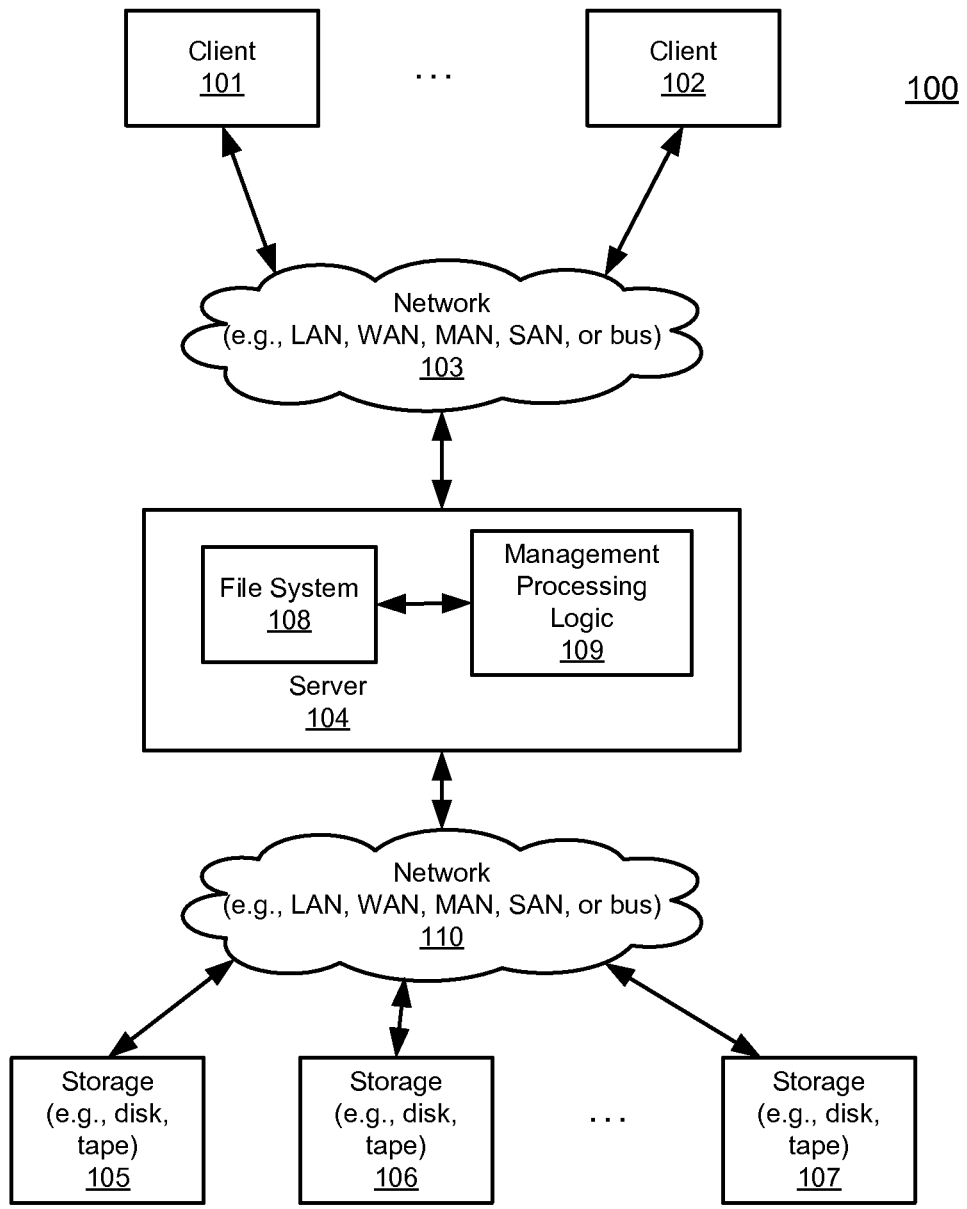
FIG. 1 is a block diagram illustrating a system configuration according to one embodiment of the invention.

FIG. 1 is a block diagram illustrating a system configuration according to one embodiment of the invention. Referring to FIG. 1, system configuration 100 includes, but is not limited to, one or more clients 101-102 communicatively coupled to a server 104 over a network 103 to access data stored in any of storage 105-107 over a network 110. Clients 101-102 may be any type of clients such as a server, a personal computer, a "thin" client, a personal digital assistant (PDA), a Web enabled appliance, or a Web enabled cellular phone, etc. Server 104 may include any type of server or cluster of servers. For example, server 104 may be a storage server used for any of various different purposes, such as to provide multiple users with access to shared data and/or to back up mission critical data. Server 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Server 104 may have a distributed architecture, or all of its components may be integrated into a single unit.

Network 103 may be any type of network such as a local area network (LAN), a wide area network (WAN) such as Internet, a corporate intranet, a metropolitan area network (MAN), a storage area network (SAN), a bus, or a combination thereof. Likewise, network 110. Storage 105-107 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage 105-107 may also be combinations of such devices. In the case of disk storage media, the storage devices 105-107 may be organized into one or more volumes of Redundant Array of Inexpensive Disks (RAID). Server 104 and/or storage 105-107 may be implemented as part of an archive and/or backup system such as the deduplicating storage systems available from Data Domain, Inc. of Santa Clara, Calif.

According to one embodiment, server 104 includes a file system 108 and management processing logic 109 such as resource management logic or data object management logic. File system 108 may be any kind of file system. A file system generally refers to a structuring of data and metadata on a storage device, such as disks, which permits reading/writing of data on those disks and/or the processing logic to enable such structuring. The metadata is organized in data structures such as inodes that are used to store information about a logical object (file in this case), while the data blocks are structures used to store the actual data for the file. The information contained in an inode may include, for example, ownership of the file, access permission for the file, size of the file, file type, and references to locations on disk of the data blocks for the file. The references to the locations of the file data are provided by pointers in the inode, which may further reference indirect blocks that, in turn, reference the data blocks, depending upon the quantity of data in the file.

Figure 7:
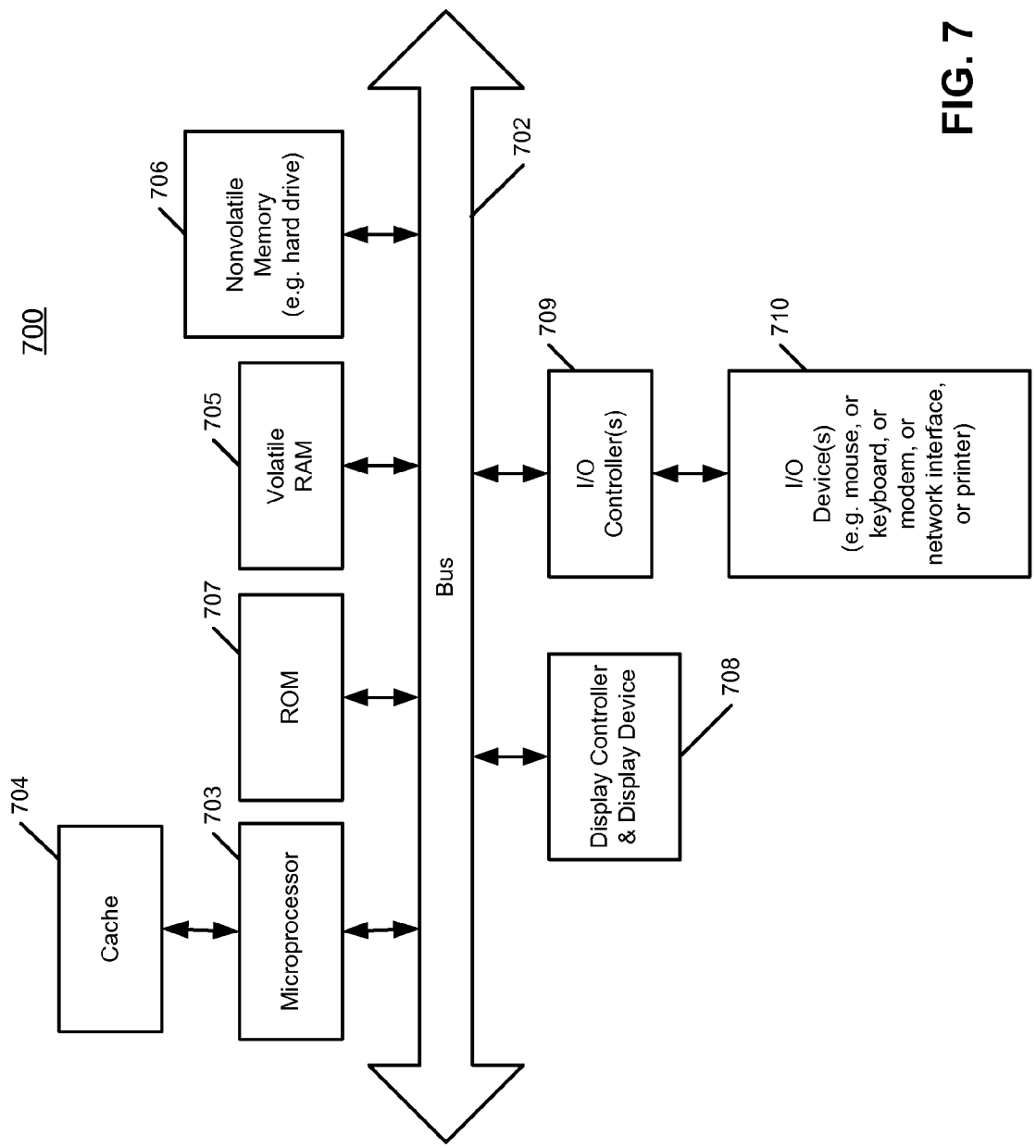
FIG. 7 is a block diagram of a data processing system which may be used with one embodiment of the invention.

Management processing logic 109 may be implemented as part of file system 108 or a separate module communicatively coupled to the file system 108. For example, management processing logic 109, as well as file system 108, may be part of deduplicating storage system as shown in FIG. 7.

Figure 2:
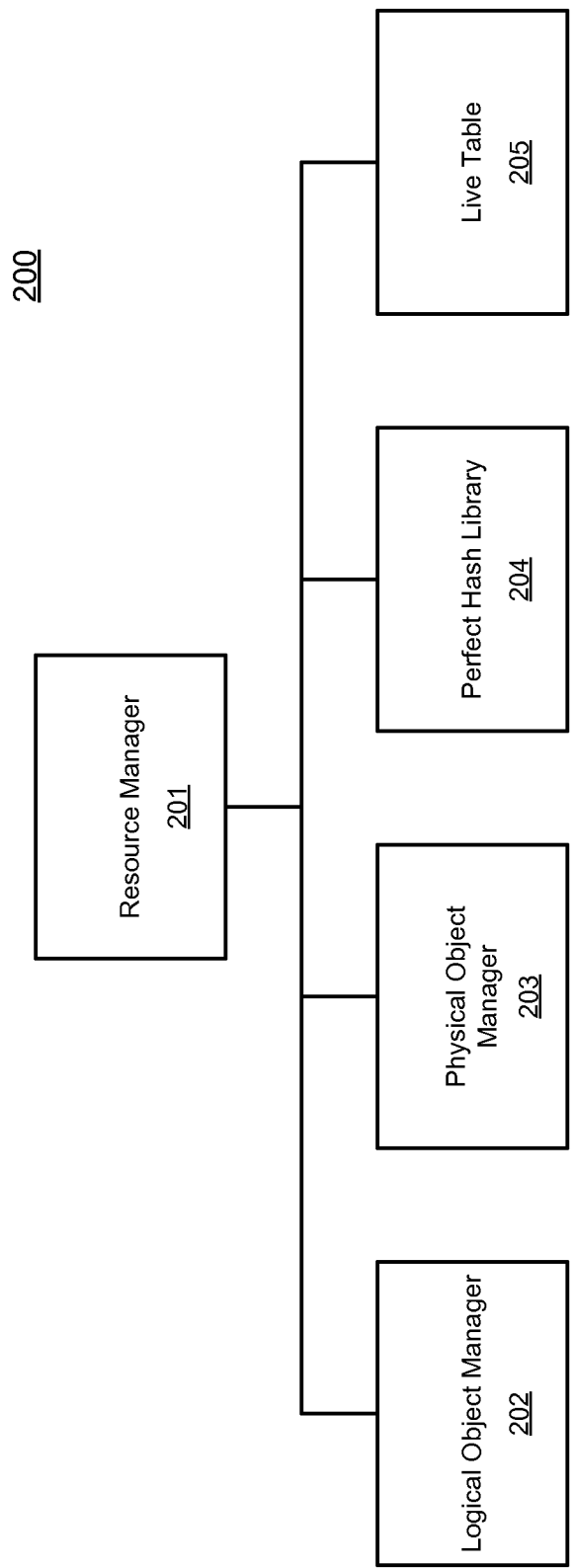
FIG. 2 is a block diagram illustrating an example of a management system of a data storage system according to one embodiment.

FIG. 2 is a block diagram illustrating an example of a management system of a data storage system according to one embodiment. For example, system 200 may be implemented as part of file system 108 and/or management processing logic 109 of FIG. 1. Referring to FIG. 2, system 200 includes, but is not limited to, a resource manager 201, a logical object manager 202, a physical object manager 203, a perfect hash library 204, and a live table 205.

In one embodiment, resource manager 201 is configured to receive and process a request for reclaiming resources of unused data objects. Physical object manager 203 is configured to manage physical data objects. Each physical data object has an identifier (ID) associated with it. In one embodiment, the ID associated with a physical object is derived based on the contents of the object. Logical object manager 202 is configured to manage logical data objects (e.g., files) in the system and maintains a mapping of each logical data object to the physical data objects associated with it. One or more logical data objects may be associated with a physical data object. In addition, perfect hash library 204 is used to generate one or more perfect hash functions for some or all of the physical objects managed by physical object manager 203. A perfect hash function may be used to update a live table 205 indicating which of the physical data objects are alive (e.g., associated or referenced by at least one logical data object).

A perfect hash function of a set S is a hash function that maps different elements in S to different numbers. Given a specific set S, a perfect hash function that can be evaluated quickly (e.g. in constant time) and with values in a "small" range relative to the number of elements in S (e.g. some constant times the number of elements in S) can be found by various algorithms such as those described in an article entitled "Simple and Space-Efficient Minimal Perfect Hash Function," by Fabiano C. Botelho et al., Proceedings of the 10th International Workshop on Algorithms and Data Structures (WADS07), Springer-Verlag Lecture Notes in Computer Science, vol. 4619, Halifax, Canada, August 2007, which is incorporated by reference herein in its entirety. In one embodiment, perfect hash library 204 is used to generate one or more such perfect hash functions.

According to one embodiment, a minimal perfect hash function is utilized herein. A minimal perfect hash function is a perfect hash function that maps a set S of n elements to n consecutive integers—usually [0 . . . n−1] or [1 . . . n]. A more formal way of expressing this is: let j and k be elements of some set S. F is a minimal perfect hash function for S if and only if F(j)=F(k) implies j=k and there exists an integer a such that the range of F is a . . . a+|S|−1.

Referring back to FIG. 2, according to one embodiment, resource manager analyzes the physical objects currently stored in a data storage system to generate a perfect hash function for these objects. The perfect hash function can be generated using a variety of algorithms, such as those described in the aforementioned article entitled "Simple and Space-Efficient Minimal Perfect Hash Function," by Fabiano C. Botelho et al. The perfect hash function is then used to compactly mark live table or tables indicating whether a particular physical data object is alive. Thereafter, the resources from the objects that have not been marked (e.g., dead data objects) can be reclaimed by the resource manager 201. Note that a perfect hash function, as well as the associated live table, may be implemented per system or sub-system (e.g., disk, volume, or directory) basis.

Figure 3:
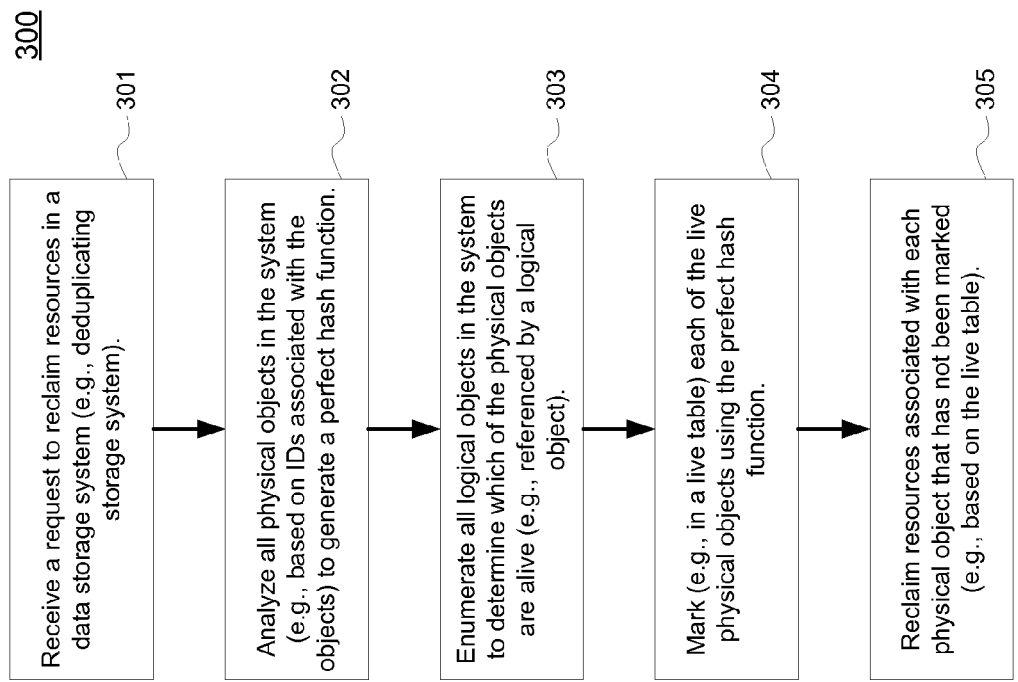
FIG. 3 is a flow diagram illustrating a process for reclaiming resources from unused data objects according to one embodiment.

FIG. 3 is a flow diagram illustrating a process for reclaiming resources from unused data objects according to one embodiment. Note that process 300 may be performed by processing logic which may include software, hardware, or a combination of both. For example, process 300 may be performed by system 200 of FIG. 2. Referring to FIG. 3, at block 301, resource manager receives a request for reclaiming resources in a data storage system.

At block 302, the resource manager performs an analysis on the physical data objects in the system to generate a perfect hash function. For example, the resource manager asks the physical object manager for the IDs associated with the physical objects in the system and hands them to the perfect hash library to generate a perfect hash function that maps each of these IDs to a unique hash value. Various algorithms can be utilized for generating perfect hash functions as described above. In one embodiment, a minimal perfect hash function is utilized. A minimal perfect hash function is a perfect hash function that maps a set of n IDs to a range of n values.

In one embodiment, the physical objects are assigned to buckets or groups and a perfect hash function is generated for each bucket. In one embodiment, the assignment of physical objects to buckets is accomplished by applying a hash function on the ID associated with each physical data object and using the hash value to select a bucket.

In addition, according to one embodiment, it is determined whether a physical object should be considered for resource reclamation, where a prefect hash function is generated for only those objects that should be considered for resource reclamation. In one embodiment, whether an object should be considered for resource reclamation is determined based on when the object was created and/or when the object was last modified. In one embodiment, whether an object should be considered for reclamation is determined based on how much resources can potentially be reclaimed by processing it. For example, if segments are of different sizes, it might be advantageous to process large segments first to reclaim storage space quickly. If physical data objects are stored in units of storage, it might be advantageous to process objects that are stored in units of storage that contain other objects that are likely to be dead.

As described above, the logical object manager manages the logical objects in the system, and maintains a mapping of each logical object to one or more physical objects associated with it. At block 303, the logical object manager iterates through this mapping to determine all of the physical objects that are alive, i.e. associated with one or more logical objects in the system.

At block 304, the resource manager applies the generated perfect hash function to the ID associated with each of the physical objects that have been determined to be alive, and uses the resulting hash value to update a live table. In one embodiment, the live table is implemented as a bit vector indexed by the hash value obtained from the perfect hash function. In other words, each physical object in the system is associated with a unique bit in the bit vector, where location of the bit is determined by the hash value obtained from the perfect hash function. The bit corresponding to a physical object is updated to indicate that the object is alive, for example, by setting a bit value to a logical high or logical low value.

After all of the physical data objects that are alive have been marked via the live table, at block 405, the resource manager consults the live table and reclaims resources from the physical objects that are not alive. In one embodiment, the resource manager asks the physical object manager for the IDs associated with the physical objects in the system, applies the perfect hash function to each of these IDs, and uses the hash value obtained from the perfect hash function to lookup the live table. If it is determined from the lookup of the live table that a physical object is not alive, the resource manager reclaims resources from the physical object. In one embodiment, the resource manager releases the storage space held by the physical object so that the storage space may be reused. Other operations may also be performed. In one embodiment, the resource manager overwrites the storage space held by the physical object at least once to ensure that the contents of the physical object cannot be recovered.

Figure 4B:
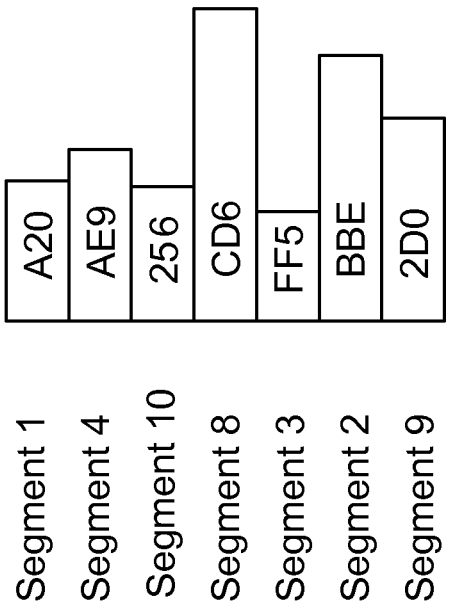
FIGS. 4A-4E are diagrams illustrating a process for reclaiming resources from unused data objects in a deduplicating storage system according to one embodiment.
Figure 4A:
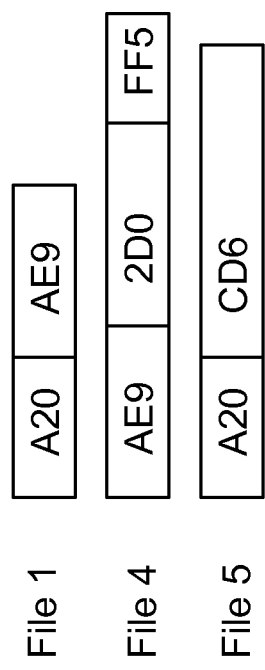

The techniques described above can be applied to a variety of storage systems such as deduplicating storage systems. FIGS. 4A-4E are diagrams illustrating a process for reclaiming resources from unused data objects in a deduplicating storage system according to one embodiment. In this example, as shown in FIG. 4A there are three files in the system—File 1, 4 and 5. File 1 is composed of two segments with IDs A20 and AE9 respectively. File 4 is composed of three segments—AE9, 2D0 and FF5. File 5 is composed of two segments—A20 and CD6. There are currently 7 segments in the system—A20, AE9, 256, CD6, FF5, BBE, and 2D0, as shown in FIG. 4B. Note that in this example, A20, AE9, 256, CD6, FF5, BBE, and 2D0 are the IDs of the corresponding segments, which may be generated based on the content of the segments, such as, for example, by performing a hash operation on the content of the segments.

Figure 4C:
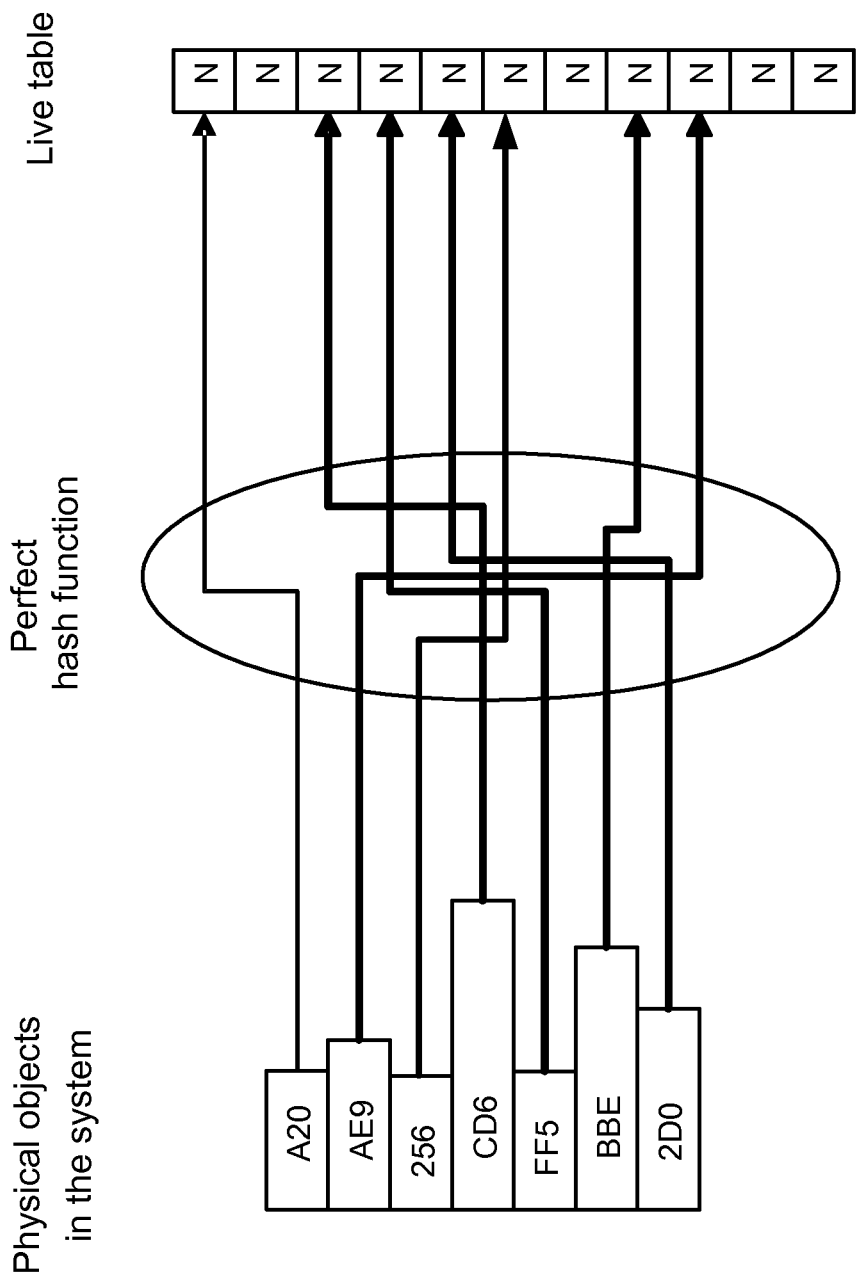
Figure 4D:
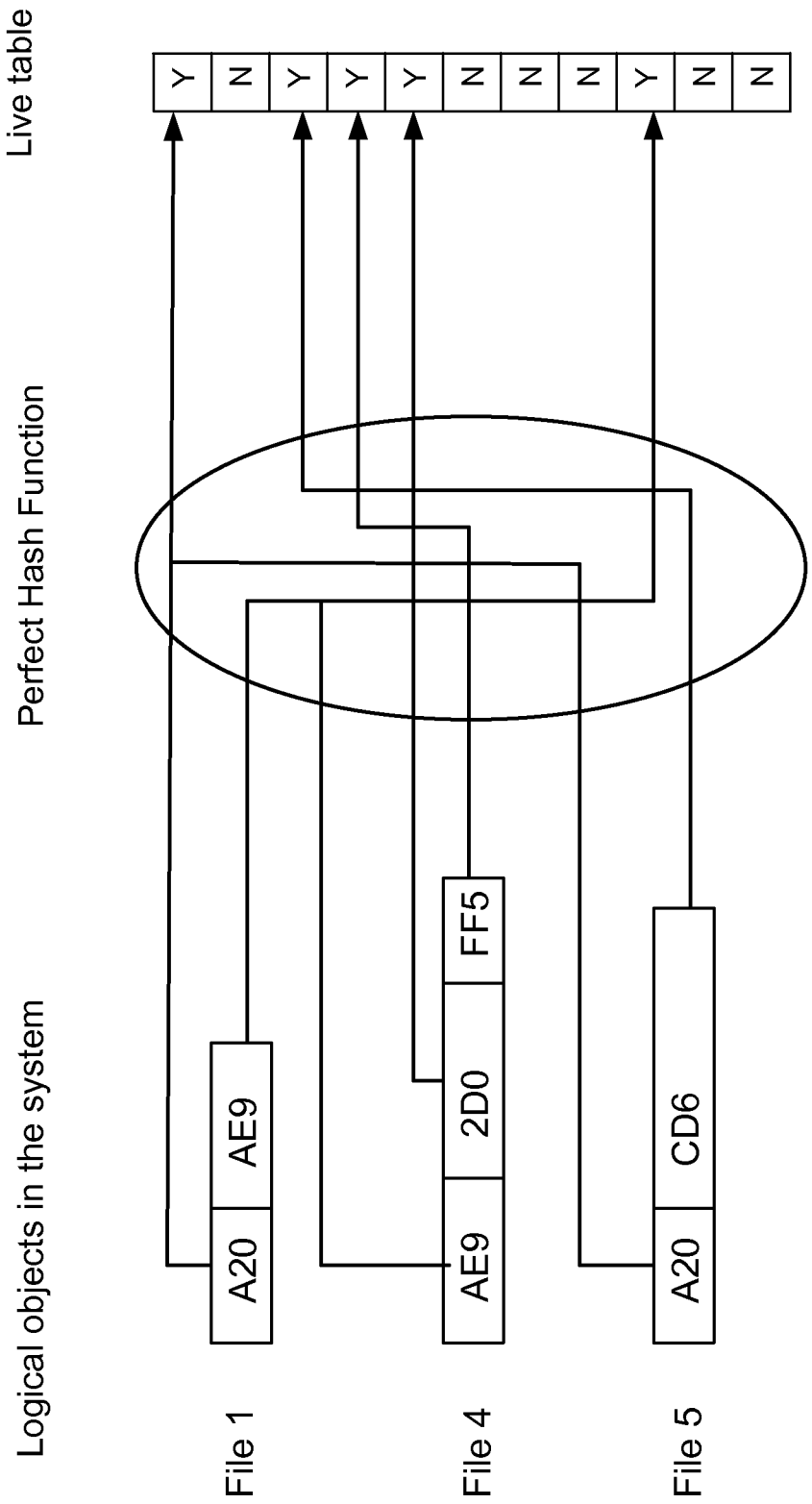

In response to a request for reclaiming resources, the segments are analyzed to generate a perfect hash function. In one embodiment, the IDs of the segments (e.g., A20, AE9, 256, CD6, FF5, BBE, 2D0 and FF5) are used to generate the perfect hash function. The perfect hash function is used to map each segment ID to a unique value. This unique value for each segment is used to select an entry in a live table that indicates whether the segment is alive. For example, the unique value (e.g., output of the perfect hash function) may be used as an index value to an entry in a live table to indicate whether the corresponding segment is alive, as shown in FIG. 4C

For each logical object, its mapping to physical objects is analyzed to determine the physical objects associated with it. As show in FIG. 4D, the perfect hash function is used to map the ID of each of the associated physical objects to a unique value which is then used to select and update an entry in the live table to indicate that the respective physical object is alive.

Figure 4E:
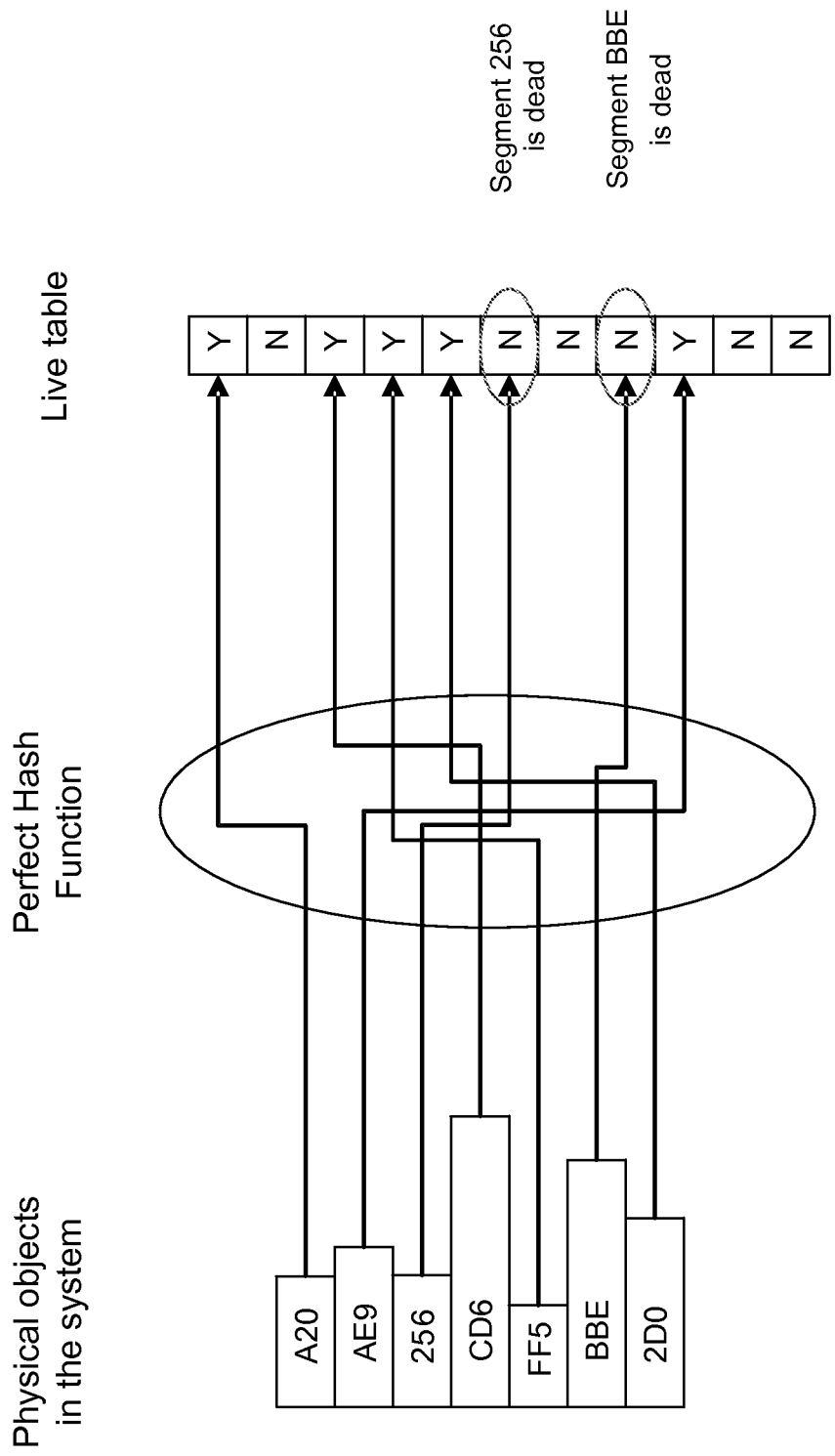

Thereafter, the perfect hash function is used to map the ID of each physical object to a unique value which is then used to select and lookup an entry in the live table, as shown in FIG. 4E. If the live table entry corresponding to a physical object to has not been updated (e.g., having a value of "N" in this example), the object is considered dead and the associated resources (e.g. storage space) are reclaimed and released back to the system as free resources. In this particular example, segments 256 and BBE are dead.

In one embodiment, reclaiming resources associated with a dead physical object includes returning the resources to a free pool so that the resources may be reused. In one embodiment, reclaiming resources includes performing operations on the storage or memory space occupied by the object to ensure that the object cannot be subsequently recovered. In one embodiment, the objects are chunks of data stored in a storage system and reclaiming resources associated with chunks of data that are no longer in use includes overwriting the storage space holding the chunks of data with at least one predetermined bit pattern.

As described above, given the nature of a perfect hash function to hash without introducing collision, the aforementioned process of marking whether a particular data object is alive is memory efficient and will not generate a false positive result. As a result, the resource reclamation process can be performed efficiently.

According to further embodiments of the invention, a perfect hash function can also be utilized in other applications of a data storage system. In one embodiment, a perfect hash function can be used to associate data objects with certain characteristics, such as, for example, access control information, location within the system, indication of whether the object is alive, etc.

Figure 5:
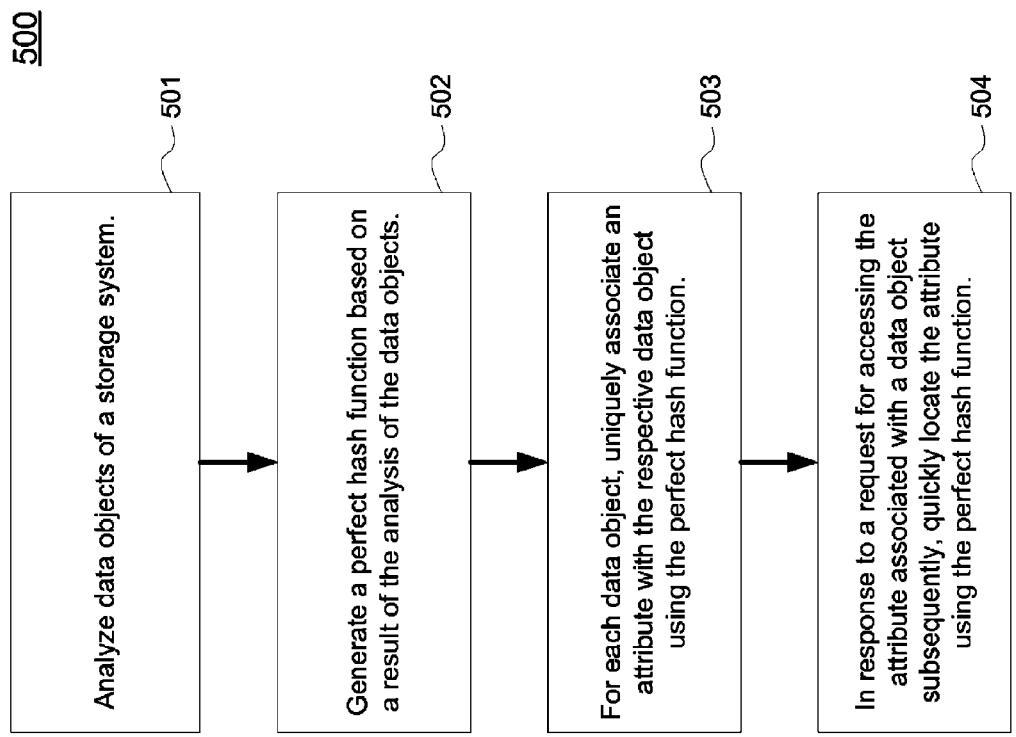
FIG. 5 is a flow diagram illustrating a process for associating an attribute with a data object using a perfect hash function according to one embodiment.

FIG. 5 is a flow diagram illustrating a process for associating an attribute with a data object using a perfect hash function according to one embodiment. Note that process 500 may be performed by processing logic which may include software, hardware, or a combination of both. For example, process 500 may be performed by storage systems as shown in FIG. 1 and/or FIG. 6.

Referring to FIG. 5, at block 501, processing logic identifies data objects (e.g., physical or logical data objects) in a data storage system. At block 502, a perfect hash function is generated based on the identified data objects (e.g., based on the IDs associated with the data objects). In one embodiment, the IDs of the data objects may be generated when the respective data objects are stored in the system. Such IDs may be generated based on content of the data objects, such as, for example, by performing a hash operation (e.g., SHA-1) on the content of the data objects.

At block 503, for each data object, processing logic uniquely associates an attribute with the respective data object using the generated perfect hash function. Subsequently, in response to a request to access the attribute of a data object, at block 504, processing logic can quickly identify and/or locate the requested attribute using the perfect hash function. For example, in response to a request for accessing the attribute of a specified data object, processing logic may perform a hash operation using the generated perfect hash function on the ID associated with the specified data object as an input. The output of the perfect hash function may be used to quickly identify a location in which the requested attribute is stored and the requested attribute can be quickly retrieved from the identified location.

Figure 6:
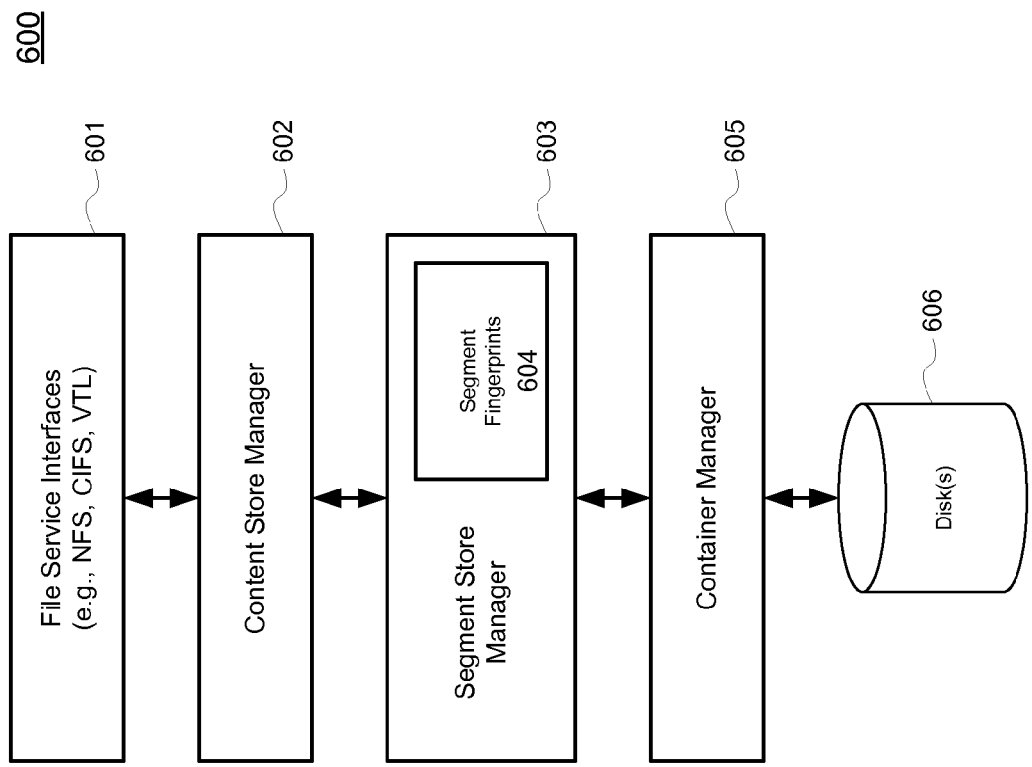
FIG. 6 is a block diagram illustrating an example of a storage system which may be used with an embodiment of the invention.

According to certain embodiments, a perfect hash function can be beneficially used in a deduplicating storage system such as those available from Data Domain, Inc. of Santa Clara, Calif. FIG. 6 is a block diagram illustrating an example of a storage system which may be used with an embodiment of the invention. For example, system 600 may be implemented as part of systems as shown in FIGS. 1-2. In this example, system 600 is a deduplicating storage system. Referring to FIG. 6, system 600 includes, but it is not limited to, file service interface 601, content store manager 602, segment store manager 603 having segment fingerprints 604, and container manager for managing segments stored in containers in disk or disks 606.

According to one embodiment, system 600 breaks a file into variable-length segments in a content dependent manner and computes a fingerprint for each segment. System 600 uses the fingerprints both to identify duplicate segments and as part of a segment descriptor used to reference a segment. It represents files as sequences of segment fingerprints. During writes, system 600 identifies duplicate segments and does its best to store only one copy of any particular segment. Before storing a new segment, system 600 may use a variation of the Ziv-Lempel algorithm to compress the segment.

In one embodiment, system 600 supports multiple access protocols which are layered on a common file services interface 601. Supported protocols include a network file system (NFS), a common Internet file system (CIFS), and a virtual tape library interface (VTL), etc.

When a data stream enters the system, it goes through one of the standard interfaces to the generic file services layer, which manages the name space and file metadata. The file services layer forwards write requests to content store 602 which manages the data content within a file. Content store 602 breaks a data stream into segments, uses segment store 603 to perform deduplication, and keeps track of the references for a file (e.g., mapping between logical data objects and physical data objects). Segment store 603 does the actual work of deduplication. It packs deduplicated (unique) segments into relatively large units, compresses such units using a variation of Ziv-Lempel algorithm to further compress the data, and then writes the compressed results into containers supported by container manager 605.

To read a data stream from the system, a client drives the read operation through one of the standard interfaces and the file services layer 601. Content store 602 uses the references to deduplicated segments to deliver the desired data stream to the client. Segment store prefetches, decompresses, reads and caches data segments from container manager 605.

According to one embodiment, content store 602 implements byte-range writes and reads for deduplicated data objects, where an object is a linear sequence of client data bytes and has intrinsic and client-settable attributes or metadata. An object may be a conventional file, a backup image of an entire volume or a tape cartridge.

To write a range of bytes into an object, content store 602 performs several operations. First, anchoring partitions the byte range into variable-length segments in a content dependent manner. Then segment fingerprinting computes a hash such as the SHA-1 hash and generates the segment descriptor based on it. Each segment descriptor contains per segment information of at least fingerprint and size. Further, segment mapping builds the tree of segments that records the mapping between object byte ranges and segment descriptors. The goal is to represent a data object using references to deduplicated segments.

To read a range of bytes in an object, content store 602 traverses the tree of segments created by the segment mapping operation above to obtain the segment descriptors for the relevant segments. It fetches the segments from Segment Store and returns the requested byte range to the client.

Segment store 603 is essentially a database of segments keyed by their segment descriptors 604. To support writes, it accepts segments with their segment descriptors and stores them. To support reads, it fetches segments designated by their segment descriptors. To write a data segment, segment store performs several operations. First, segment filtering determines if a segment is a duplicate. This is the key operation to deduplicate segments and may trigger disk I/Os, thus its overhead can significantly impact throughput performance. Further, container packing adds segments to be stored to a container which is the unit of storage in the system. The packing operation also compresses segment data using a variation of the Ziv-Lempel algorithm. A container, when fully packed, is appended to the Container Manager. Finally, segment indexing updates the segment index that maps segment descriptors to the container holding the segment, after the container has been appended to the container manager 605.

To read a data segment, segment store 603 performs certain operations. First, segment lookup finds the container storing the requested segment. This operation may trigger disk I/Os to look in the on-disk index, thus it is throughput sensitive. Container retrieval reads the relevant portion of the indicated container by invoking the container manager 605. Container unpacking decompresses the retrieved portion of the container and returns the requested data segment.

The container manager 605 provides a storage container log abstraction, not a block abstraction, to segment store 603. A container includes a metadata section having the segment descriptors for the stored segments. They are immutable in that new containers can be appended and old containers deleted, but containers cannot be modified once written. When segment store 603 appends a container, the container manager 605 returns a container ID which is unique over the life of the system.

The container manager 605 is responsible for allocating, deallocating, reading, writing and reliably storing containers. It supports reads of the metadata section or a portion of the data section, but it only supports appends of whole containers. If a container is not full but needs to be written to disk, it is padded out to its full size.

Container manager 605 is built on top of standard block storage 606. Advanced techniques such as software RAID-6, continuous data scrubbing, container verification, and end to end data checks are applied to ensure a high level of data integrity and reliability.

The container abstraction offers several benefits: 1) the fixed container size makes container allocation and deallocation easy; 2) the large granularity of a container write achieves high disk throughput utilization; and 3) a properly sized container size allows efficient full-stripe RAID writes, which enables an efficient software RAID implementation at the storage layer. Further detailed information regarding system 600 can be found in an article entitled "Avoiding the Disk Bottleneck in the Data Domain Deduplication File System," by Zhu et al., which is incorporated herein in its entirety. Other configurations may also be applied herein.

According to one embodiment, file service interfaces 601, segment store manager 603, or both include logic to analyze the data objects stored in system 600, to generate a perfect hash function for the data objects, and to use the perfect hash function to process the data objects such as marking whether a particular data object is alive or alternatively, to uniquely represent or identify a predetermined attribute of a particular data object, etc., as described above.

FIG. 7 is a block diagram of a data processing system which may be used with one embodiment of the invention. For example, the system 700 shown in FIG. 7 may be used as a client computer system such as clients 101-102 of FIG. 1. Alternatively, the exemplary system 700 may be implemented as a server 104 of FIG. 1.

Note that while FIG. 7 illustrates various components of a computer system, it is not intended to represent any particular architecture or manner of interconnecting the components; as such details are not germane to the present invention. It will also be appreciated that network computers, handheld computers, cell phones, and other data processing systems which have fewer components or perhaps more components may also be used with the present invention. The computer system of FIG. 7 may, for example, be an Apple Macintosh computer or an IBM compatible PC.

As shown in FIG. 7, the computer system 700, which is in a form of a data processing system, includes a bus or interconnect 702 coupled to a processor 703 and a ROM 707, a volatile RAM 705, and a non-volatile memory 706. Processor 703 may include multiple processors and/or core logics that constitute central processing units (CPUs) of the system and thus, control the overall operations of the system. According to certain embodiments, processor 703 accomplish this by executing software stored in any of the memories 705-707, such as, for example, applications and operating system, etc. Processor 703 may include, one or more programmable general-purpose or special-purpose microprocessors, digital signal processors (DSPs), programmable controllers, application specific integrated circuits (ASICs), programmable logic devices (PLDs), or the like, or a combination of such devices.

The processor 703, which may be, for example, an Intel processor or a PowerPC processor, is coupled to cache memory 704 as shown in the example of FIG. 7. The bus 702 interconnects these various components together and also interconnects these components 703 and 705-707 to a display controller and display device 708, as well as to input/output (I/O) devices 710, which may be mice, keyboards, modems, network interfaces, printers, and other devices which are well-known in the art.

Typically, the input/output devices 710 are coupled to the system through input/output controllers 709. The volatile RAM 705 is typically implemented as dynamic RAM (DRAM) which requires power continuously in order to refresh or maintain the data in the memory. The non-volatile memory 706 is typically a magnetic hard drive, a magnetic optical drive, an optical drive, a DVD RAM, a Flash memory, or other type of memory system which maintains data even after power is removed from the system. Typically, the non-volatile memory will also be a random access memory, although this is not required.

While FIG. 7 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 702 may include one or more buses connected to each other through various bridges, controllers, and/or adapters, as is well-known in the art. In one embodiment, the I/O controller 709 includes a USB (Universal Serial Bus) adapter for controlling USB peripherals. Alternatively, I/O controller 709 may include an IEEE-1394 adapter, also known as FireWire adapter, for controlling FireWire devices. Other components may also be included.

Thus, techniques for managing data objects of a data storage system have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing data objects of a data storage system, the method comprising:
    generating identifiers for a plurality of data objects stored in the data storage system based on content of each of the data objects, the identifiers uniquely identifying the data objects, each data object associated with an attribute;
    generating a hash function based on the identifiers and a total number of the data objects, the hash function to map the data objects into unique values within a value range determined by the total number of the data objects;
    storing an attribute associated with each data object at a location of the data storage system according to the hash function; and
    in response to a request for accessing a first attribute associated with a first data object subsequently, locating the first attribute from a first location using the hash function applied to the first data object, wherein the value range allows the locating to be performed quickly.

2. The method of claim 1, wherein the data storage system is a deduplicating storage system.

3. The method of claim 1, wherein an identifier of a data object is generated by hashing at least a portion of the content of the data object.

4. The method of claim 1, wherein the hash function is a minimal hash function that maps a set of N elements to a range of N values, and wherein an identifier of a data object is used as an input to the minimal hash function.

5. The method of claim 1, wherein the hash function is a perfect minimal hash function.

6. The method of claim 1, wherein the predetermined attribute of a data object includes a storage location of the data object.

7. The method of claim 1, wherein the predetermined attribute of a data object includes an access control attribute of the data object.

8. A non-transitory computer-readable medium having instructions stored therein, which when executed by a processor, cause the processor perform operations, the operations comprising:
    generating identifiers for a plurality of data objects stored in the data storage system based on content of each of the data objects, the identifiers uniquely identifying the data objects, each data object associated with an attribute;
    generating a hash function based on the identifiers and a total number of the data objects, the hash function to map the data objects into unique values within a value range determined by the total number of the data objects;
    storing an attribute associated with each data object at a location of the data storage system according to the hash function; and
    in response to a request for accessing a first attribute associated with a first data object subsequently, locating the first attribute from a first location using the hash function applied to the first data object, wherein the value range allows the locating to be performed quickly.

9. The non-transitory computer-readable medium of claim 8, wherein the data storage system is a deduplicating storage system.

10. The non-transitory computer-readable medium of claim 8, wherein an identifier of a data object is generated by hashing at least a portion of the content of the data object.

11. The non-transitory computer-readable medium of claim 8, wherein the hash function is a minimal hash function that maps a set of N elements to a range of N values, and wherein an identifier of a data object is used as an input to the minimal hash function.

12. The non-transitory computer-readable medium of claim 8, wherein the hash function is a perfect minimal hash function.

13. The non-transitory computer-readable medium of claim 8, wherein the predetermined attribute of a data object includes a storage location of the data object.

14. The non-transitory computer-readable medium of claim 8, wherein the predetermined attribute of a data object includes an access control attribute of the data object.

15. A data storage system, comprising:
    a processor; and
    memory coupled to the processor to store instructions, which when executed from the memory, cause the processor to
    generate identifiers for a plurality of data objects stored in the data storage system based on content of each of the data objects, the identifiers uniquely identifying the data objects, each data object associated with an attribute;
    generate a hash function based on the identifiers and a total number of the data objects, the hash function to map the data objects into unique values within a value range determined by the total number of the data objects;

store an attribute associated with each data object at a location of the data storage system according to the hash function, and in response to a request for accessing a first attribute associated with a first data object subsequently, locate the first attribute from a first location using the hash function applied to the first data object, wherein the value range allows the locating to be performed quickly.

16. The system of claim 15, wherein the data storage system is a deduplicating storage system.

17. The system of claim 15, wherein an identifier of a data object is generated by hashing at least a portion of the content of the data object.

18. The system of claim 15, wherein the hash function is a minimal hash function that maps a set of N elements to a range of N values, and wherein an identifier of a data object is used as an input to the minimal hash function.

19. The system of claim 15, wherein the hash function is a perfect minimal hash function.

20. The system of claim 15, wherein the predetermined attribute of a data object includes a storage location of the data object.

21. The system of claim 15, wherein the predetermined attribute of a data object includes an access control attribute of the data object.

* * * * *